United States Patent Office

3,215,621
Patented Nov. 2, 1965

3,215,621
QUATERNARY AMMONIUM REAGENTS IN THE ION EXCHANGE OF ANIONIC SURFACTANTS
James M. White, Minneapolis, and Herbert N. Dunning, St. Paul, Minn., and Maurice M. Kreevoy, Headington, England, assignors to General Mills, Inc., a corporation of Delaware
No Drawing. Filed Feb. 7, 1963, Ser. No. 256,833
6 Claims. (Cl. 210—21)

This application is a continuation-in-part of United States patent application Serial No. 105,807, filed April 26, 1961, now abandoned.

This invention relates to an ion exchange process and more particularly to a novel ion exchange process for a separation of anionic surfactants utilizing quaternary ammonium compounds as the ion exchange reagent.

The removal of surface active agents from aqueous solutions is one of the more difficult separation problems. There are two related problems involved. One problem is the removal and recovery of the surface active agent, and the other problem is the purification of the aqueous medium. Typically, very small amounts of surface active materials have profound effects on the properties of an aqueous system. If one is mainly concerned with purifying aqueous media, the surface active agent must be reduced to a very low concentration to eliminate the effect of the surface active material. Where the problem involves recovery of the surface active material, the reduction of the concentration to an extremely low level is not so acute, except where the surface active material is highly valuable.

The removal of surface active materials is of particular interest in the treatment of sewage and industrial wastes. The separation of surfactants from the sewage has recently become more acute with the wide-spread use of anionic detergents, particularly of the alkyl aryl sulfonate type. Unlike the previously used soaps, these detergents are not readily consumed by bacteria and other organisms. Accordingly, when sewage containing an alkyl aryl sulfonate is discharged into a river or lake or disposed of underground, the alkyl aryl sulfonate becomes a more or less permanent addition to the body of water. In rivers, the amount of detergent builds as the river flows past communities discharging detergent-containing sewage. In many parts of this country, lakes and ground water are already contaminated with detergents. In most sections of the country, this problem is presently not acute. However, the levels of detergent in these bodies of water will continue to grow, and in the future, will present a hazard not only to drinking water for human consumption, but also to fish and other life dwelling in our lakes and rivers. Further, it may render the water unuseable in many present commercial operations. At the present time in some localities of the country the level of detergent in the available water supply is sufficiently hight to affect adversely the foaming properties of beer made therefrom. In anticipation of the continuing build-up of detergents, some breweries are considering processes for removing detergent from their water supply. This is just one example of many industries whose products or processes require water of high purity.

The problem of detergent contamination has been avoided in some of the countries of the world by prohibiting the use of detergents. This is unfortunate, since detergents are highly effective cleansing agents. It would be highly advantageous to the peoples of such countries if there were available to them a process which would cheaply remove detergents from sewage and industrial wastes so that detergents could be used in cleansing processes.

In the United States, launderettes have become quite popular. If the detergents were removed from the sewage of laundries and launderettes, the amount of contamination of water supplies would be considerably reduced. In addition to this immediate problem, is the treatment of the entire sewage and industrial wastes of factories and communities.

Recently we have discovered a unique process for the removal and recovery of anionic surfactants from aqueous solutions. Broadly stated, the process involves contacting the aqueous solution containing the organic anionic surfactant with a water-immiscible organic solvent containing an ion exchange reagent which is capable of complexing with the anionic surfactant and thereby removing the surfactant from the aqueous solution. The organic solvent solution containing the loaded ion exchange agent is mechanically separated and if desired the surfactant is stripped from the loaded organic solvent and recovered or destroyed. The organic solvent containing the regenerated ion exchange material can then be reused to remove anionic surfactants from another quantity of aqueous solution. Optionally, the loaded organic solution may be replaced by fresh ion exchange solution and the loaded ion exchange solution used as a fuel or employed in some other process or use. Where the organic solvent employed is a good fuel, this method provides some advantages. The labor and expense of the recovery are avoided. This method is particularly advantageous where a cheap but highly effective ion exchange reagent is available.

From the above discussion it should be apparent that the type of liquid ion exchange reagent employed has a great deal of effect on the process. We have now discovered a new broad class of liquid ion exchange reagent for the removal of anionic surfactants.

It is an object of this invention to provide an improved system of removing detergents from aqueous systems. It is another object of this invention to provide a highly efficient separative process for surface active materials. It is a further object of this invention to provide a highly economic method of treating sewage and waste waters to remove detergents. It is still another object of this invention to provide a new class of liquid ion exchange reagents for the removal of anionic surfactants. It is still a further object of this invention to provide a class of liquid ion exchange reagents which is capable of quantitative removal of anionic surfactants from aqueous solutions. It is still a further object of this invention to provide an improved process for removing anionic surfactants from aqueous systems without substantial contamination of the aqueous system with other organic materials. Other objects will appear hereinafter.

The objects of this invention are accomplished by a process which comprises contacting an aqueous solution of an organic anionic surfactant with an organic solvent solution of a quaternary ammonium compound having more than 10 carbon atoms, and separating the resulting solutions. In accordance with the present invention it was discovered that the process was highly effective in separating and removing detergents from aqueous systems. It was also discovered that the process was adaptable to the large scale treatment of sewage and industrial waste with a low cost per unit of solution treated. It was also found that the quaternary ammonium compounds were extremely effective in removing the anionic surfactants and that quantitative removal was feasible.

The term "anionic surfactant" as used herein means a surface active agent which is capable of exhibiting anionic properties. The term "water-immiscible organic solvent" as used herein refers to an organic material normally liquid which is substantially, but not necessarily entirely, insoluble in water. The term "liquid ion exchange" refers to an ion exchange process in which the ion exchange material is used in solution rather than in a solid state, as is the case with ion exchange resins. Many of the ion exchange reagents of the present invention are liquids at room temperature, while others are normally solid materials. When these materials are dissolved in a suitable solvent, there is formed a solution which has ion exchange properties for anionic surfactants.

Various methods of contacting the aqueous solution and the organic solution can be employed. One suitable method is to mix the two solutions thoroughly and then let the layers separate. If the process is carried out continuously, the two solutions can be fed to a chamber containing rotating mixing paddles, or they can be fed to an injection mixer and from the mixer to a quiescent zone for separation. Generally it may be said that extremely violent agitation should be avoided to decrease the tendency to form emulsion.

Generally the amount of organic solution is considerably less than the amount of aqueous solution. In a typical continuous process the rate of flow of the aqueous phase to the organic phase would be about 30:1 to 1000:1. This however, may vary widely depending on materials, concentrations, conditions, etc., from 1:1 to 500,000:1.

The preferred organic solvents for the process of the present invention are the hydrocarbons. Examples of suitable hydrocarbon solvents include isooctane, kerosene, "Soltrol 170," a commercially available naphthenic hydrocarbon solvent, benzene, toluene, xylene, isodecane, fuel oils, mineral oils, hexane, heptane, and octane. Solvents which contain functional groups can also be employed in the present invention, providing that the functional groups do not adversely affect the extraction, and provided that the molecular weight is sufficiently high so as to make the organic solvents substantially insoluble in water. Illustrative of such compounds are the alcohols, aldehydes, ketones, and esters such as naturally occuring vegetable oils.

Generally, any surface active agent which exhibits anionic properties can be separated by the present invention. It should be clearly understood that the process can be used to recover materials not generally used as surfactants as long as the material has the anionic and surface active properties. It should be noted that many natural wastes, or their degradation products fall into this classification: the fatty acids, carboxylic acids in general such as acetic, propionic, butyric, valeric, stearic, oleic, palmitic, glycerides, proteins, protein hydrolysates, amino acids, bile acids, uric acid, pyrrolidone carboxylic acid, sodium acetyl salicylic acid, chlorocrotonic acid, undecylenic acid, sorbic acid, citaconic acid, acrylic acid, and citric acid. In some cases, certain surfactants may be cationic or exhibit amphoteric properties under certain conditions, but if they exhibit anionic properties in the process of the present invention, they will be considered as anionic surfactants for purpose of the present invention. Examples of preferred detergents which can be removed by the process of the present invention include the alkyl aryl sulfonates such as sodium dodecylbenzenesulfonate, sodium xylene sulfonate, sulfonated glycerines, alkyl phosphates, the alkyl alcohol sulfates, such as sodium lauryl sulfate, soaps, such as sodium stearate, the $\beta$-alanines and other fatty amino acids and derivatives thereof such as sodium N-lauryl-$\beta$-aminopropionate, disodium N-tallow-$\beta$-imino diprionate, N-lauryl-$\beta$-aminoprionic acid, and the partial sodium salt of N-lauryl-$\beta$-imino dipropionate. These latter materials are amphoteric in nature, and can be separated by the process of the present invention under certain conditions. Still other surfactants which can be separated by the process of the present invention include diisobutyl sodium sulfosuccinate, alkyl naphthalene sodium sulfonate, sulfonated castor oil, sulfonated tall oil, sulfonated petroleum residuals, salts of sulfated fatty acid ester, perfluro caprylic acid, sodium ligno sulfonate, sodium lauryl sulfoacetate, tetra sodium ethylene diamine tetra acetic acid, sodium salt of alkyl aryl polyether sulfonate, ammonium salt of sulfate ester of an alkyl phenoxy polyethanol, polyoxyethylene sorbitan tall oil ester, sodium methyl oleyl taurate, sodium salt of a sulfonated naphthalene-formaldehyde condensate, terpene fatty acid salt complex, triethanolamine alkyl aryl sulfonate, and ammonium tridecyl benzene sulfonate.

The quaternary ammonium reagents of the present invention are relatively difficult to strip. However, if it is desired to strip these materials stripping agents can be employed. Exemplary stripping solutions include solutions of perchlorates and other salts. Stripping agents which are less effective but which can be used include salts of calcium and barium.

An extremely important advantage of the reagents of the present invention is that the extraction can be carried out over an extremely broad range of pH; indeed, from pH's of 1 to 11. Other reagents generally require neutral or slightly acidic conditions while the present reagents can be used at high pH's as well as low pH's. One of the distinct advantages of employing the reagents of the present invention is that extraction can be carried out at relatively high pH's compared to other materials.

The process of the present invention can be carried out over a wide variety of temperatures. Generally it is preferred to carry out the process at temperatures in the range of 25 to 75° C. The temperature limits are governed by the freezing and boiling points of the liquid phases. One advantage of the present process is that where the aqueous solution is to be reused, such as in a laundry operation, the process can be carried out without cooling down the aqueous phase, thereby saving considerable amounts of money in heating the water.

The quaternary compound employed does not appear to be critical. All quaternary compounds are generally useful in the process of the present invention. It is important to have a quaternary ammonium compound which is substantially insoluble in water, accordingly it is preferred to employ quaternary ammonium compounds having more than about 10 carbon atoms. Specific examples of quaternary ammonium compounds which are useful in the present invention include lauryltrimethyl ammonium chloride, myristyltrimethyl ammonium chloride, palmityltrimethyl ammonium chloride, stearyltrimethyl ammonium chloride, oleytrimethyl ammonium chloride, linoleyltrimethyl ammonium chloride, dilauryldimethyl ammonium methyl sulfate, dimyristyldimethyl ammonium chloride, dipalmityldimethyl ammonium chloride, distearyldimethyl ammonium chloride, dioleyldimethyl ammonium bromide, dilinoleyldimethyl ammonium chloride, trilaurylmethyl ammonium chloride, trioctylmethyl ammonium bromide, tridecylmethyl ammonium chloride, stearylbenzyldimethyl ammonium bromide, N-trimethyl-N'-dimethyl propylene diammonium dichloride and N-trimethyl - N' - dimethyltallow propylene diammonium dichloride. These preferred compounds are represented by the formulas:

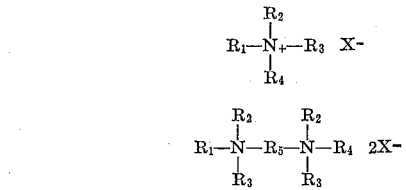

where $R_1$ is an aliphatic or aromatic radical of 6 to 24 carbon atoms, $R_2$, $R_3$, and $R_4$ are hydrocarbon radicals of 1 to 24 carbon atoms, $R_5$ is a divalent hydrocarbon radical of 2 to 6 carbon atoms and X is an inorganic salt forming anion. Compounds containing acetylenic unsaturation are generally not used as liquid ion exchange reagents because of the difficulty of preparation and because of their cost. However, if desired such nonpreferred reagents can be employed.

Another group of materials which is useful in the present invention are the hydroxy fatty nitrogen compounds which have two nitrogen-containing groups, one of which is a quaternary ammonium radical situated on a carbon atom adjacent to a hydroxyl group, and the other nitrogen-containing group occupying a terminal position. Commercially, these materials are prepared from oleic acid and accordingly have 18 carbon atoms in the main carbon chain. However, they also may be derived from other lower or higher molecular weight unsaturated acids. Because of the method of preparation, these materials are usually mixtures of isomers. The isomers are not separated for most commercial uses. Specific examples of such materials include 1,9-di-(trimethyl ammonium) - 10 - hydroxyoctadecane dichloride, 1,9 - di - (dimethylbenzyl ammonium)-10-hydroxyoctadecane dichloride, 1,9 - di - (benzylmorpholinium) - 10 - hydroxyoctadecane dichloride, 1,9-di-(trimethyl ammonium)-9-hydroxyoctadecan dimethyl sulfate, 1,9-di-trimethyl ammonium-10-hydroxyoctadecane dibromide 1-cyano-9-(trimethyl-ammonium,-10-hydroxyheptadecane chloride, 1-cyano - 10 - (N - methylmorpholinium) - 9 - hydroxyheptadecane chloride, and 1-cyano-9-(trimethyl ammonium)-10-hydroxyheptadecane methyl sulfate. These preferred materials are represented by the formulas:

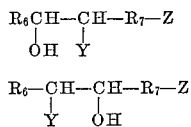

where $R_6$ and $R_7$ are aliphatic hydrocarbon radicals of 1 to 22 carbon atoms and the total number of carbon atoms in $R_6$ and $R_7$ is 6-22, Y is a quaternary ammonium radical, and Z is an amino radical, quaternary ammonium radical, or nitrile.

Still another reagent which is highly effective is the quaternization product of the diamine derived from dimerized linoleic and dimerized oleic acids.

In order to illustrate certain preferred embodiments of the present invention, the following examples are included. Unless otherwise indicated, all parts and percentages used herein are by weight.

EXAMPLE I

Into a separatory funnel were charged 20 ml. of kerosene containing 1,000 p.p.m. of a methyl trialkyl quaternary ammonium chloride wherein the alkyl groups were randomly distributed straight chain alkyl radicals of 8 and 10 carbon atoms and 20 ml. water containing 20 p.p.m. of sodium dodecylbenzene sulfonate at a pH of 6.23. After mixing the two solutions the solutions were allowed to separate and the amount of sodium dodecylbenzene sulfonate in the aqueous phase was determined and converted into the percent of sodium dodecylbenzene sulfonate extracted. This experiment was carried out at several other pH's and detergent concentrations. Results of these experiments appear in Table I.

Table I

| DBS, Initial | pH | Percent Extraction |
|---|---|---|
| 20 | 6.23 | 100.0 |
| 40 | 5.47 | 100.0 |
| 60 | 5.01 | 100.0 |
| 80 | 4.52 | 100.0 |
| 120 | 4.19 | 100.0 |
| 150 | 3.81 | 100.0 |
| 200 | 3.00 | 100.0 |

These data show that ionic detergents are completely extracted from water. There was no effect of pH within the range of pH tested.

EXAMPLE II

A saturated solution of the quaternary ammonium compound of Example I and kerosene was prepared. Analysis of the solution showed it to be 0.06 molar in the quaternary ammonium compound. Then, 2% isodecanol was added to the solution and 50 ml. of the resulting solution was used to extract 50 ml. of an aqueous solution 0.13 molar in sodium hydroxide and containing 100 p.p.m. of dodecylbenzene sulfonate. The final concentration of the dodecylbenzene sulfonate was measured and the percent extraction was calculated. This experiment was repeated with 4 other aqueous solutions each of which was 0.13 molar in sodium hydroxide and contained 100 p.p.m. of phosphate ion, pyrophosphate ion, nitrate ion and nitrite ion, respectively. Results of these experiments appear in Table II.

Table II

| Ion: | Percent extraction |
|---|---|
| DBS | 100 |
| $PO_4^{-3}$ | 86 |
| $P_2O_7^{-4}$ | 99 |
| $NO_3^-$ | 96.5 |
| $NO_2^-$ | 54 |

The results of these experiments show that in basic solutions quaternary ammonium compound is still an excellent extractant for the anionic surfactant. The experiment also shows that inorganic anions may be removed from the aqueous solution along with the anionic surfactant.

EXAMPLE III

A sample of dodecylbenzene sulfonate containing 54.8% dodecylbenzne sulfonate and the remainder sodium sulfate was used to prepare aqueous solutions containing 1000 p.p.m. of dodecylbenzene sulfonate. Portions of this solution were extracted with a kerosene solution of the quaternary ammonium compound of Example I at various concentrations. The aqueous solution was 0.093 molar in sodium hydroxide. The results of these experiments appear in Table III.

Table III

| Molar concentration of quaternary ammonium compound: | Percent extraction |
|---|---|
| 0.06 | 95.7 |
| 0.03 | 94.6 |
| 0.012 | 94.6 |

Substantially the same experiments were carried out using a commercially available detergent containing 90% dodecylbenzene sulfonate to prepare an aqueous solution containing 1000 p.p.m. of sodium dodecylbenzene sulfonate. This aqueous solution was also 0.093 molar in sodium hydroxide. The results of this experiment appears in Table IV.

Table IV

| Molar concentration of quaternary ammonium compound: | Percent extraction |
|---|---|
| 0.06 | 95.7 |
| 0.03 | 94.6 |
| 0.012 | 94.6 |

EXAMPLE IV

The following experiment was carried out to determine the effectiveness of the process of the present invention in removing anionic surfactants from raw sewage. A raw sewage sample collected from a municipal sewage system was fed to a stirred chamber at the rate of 13 gallons per minute. Kerosene containing 5% of the quaternary ammonium compound of Example I and 5% isodecanol was fed to the mixer at a rate of 175 ml./min. The experiment was run continuously for 20 hours. After 11 hours of operation samples were collected at 3 hour intervals and analyzed for sodium dodecylbenzene sulfonate. The results of these experiments appear in Table V.

*Table V*

| Hours of Operation | DBS, p.p.m. | | Percent DBS Extracted |
|---|---|---|---|
| | Incoming | Outgoing | |
| 11 | 8.95 | 0.05 | 99.4 |
| 14 | 7.45 | 0.03 | 99.6 |
| 17 | 10.03 | 0.07 | 99.3 |
| 20 | 8.17 | 0.05 | 99.4 |

EXAMPLE V

A kerosene solution containing 50 grams per liter of the quaternary ammonium compound of Example I and 5% isodecanol was used to extract raw sewage at an aqueous to organic ratio of 20:1. The loaded organic phase contained approximately 160 p.p.m. of sodium dodecylbenzene sulfonate after the extraction. A 50 ml. portion of the loaded ion exchange material was stripped twice with 10 ml. portions of an aqueous stripping agent consisting of 0.5 molar sodium perchlorate and 20% ethanol. The spent stripping solutions were analyzed for sodium dodecylbenzene sulfonate in order to determine the effectiveness of the stripping process. The first stripping solution contained approximately 250 p.p.m. of sodium dodecylbenzene sulfonate and the second stripping solution contained approximately 650 p.p.m. of sodium dodecylbenzene sulfonate. These data indicate that the stripping agent was highly effective in removing the dodecylbenzene sulfonate from the loaded ion exchange solution.

The foregoing examples have been included as illustrations of certain preferred embodiments of the present invention and are not to be construed as limitations on the scope thereof.

The process of the present invention is useful in purifying aqueous systems such as laundry wastes, sewage, and industrial wastes. The process is particularly useful when quantitative or nearly quantitative extraction of the surfactant is required.

The embodiments of the present invention in which an exclusive property or privilege is claimed are defined as follows:

1. A continuous method of removing organic anionic surfactants from waste water which comprises: (1) contacting said waste water with a liquid water-immiscible organic phase comprising a solvent solution of a quaternary ammonium compound containing more than 10 carbon atoms to form a complex in the immiscible organic phase of the surfactant and the quaternary ammonium compound; (2) separating the immiscible organic phase containing the complex from the treated waste water; (3) discharging the treated water; (4) contacting the immiscible organic phase containing the complex with an aqueous stripping solution to break the complex and extract the surfactant into the said aqueous stripping solution; (5) separating the stripped immiscible organic phase containing the quaternary ammonium compound from the aqueous stripping solution; and (6) recycling the immiscible organic phase containing the quaternary ammonium compound for contacting further quantities of waste water.

2. The process of claim 1 wherein the organic anionic surfactant is a sulfonate.

3. The process of claim 1 wherein the organic anionic surfactant is an alkyl sulfate.

4. The process of claim 1 wherein the organic solvent for the quaternary ammonium compound is a hydrocarbon solvent.

5. The process of claim 4 wherein the hydrocarbon solvent is kerosene.

6. The process of claim 1 wherein the quaternary ammonium compound has the formula:

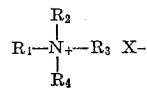

where $R_1$ is selected from the group consisting of aliphatic and aromatic radicals of 6–24 carbon atoms, $R_2$, $R_3$ and $R_4$ are hydrocarbon radicals of 1 to 24 carbon atoms, X is an inorganic anion and the total number of carbon atoms in $R_1$, $R_2$, $R_3$ and $R_4$ is more than 10.

References Cited by the Examiner

Text I, Surface Active Agents by Schwartz and Perry, copyright 1949, by Interscience Publishers Inc., article, "Cationic Surface Active Agents," pages 151–156 particularly relied upon.

Text II, Ion Exchange by Helfferick, copyright 1962, by the McGraw-Hill Book Co., Inc., article "Liquid Ion-Exchangers," pages 19–20 relied upon.

MORRIS O. WOLK, *Primary Examiner.*